United States Patent
Lepa et al.

(10) Patent No.: US 11,927,258 B2
(45) Date of Patent: Mar. 12, 2024

(54) TRANSMISSION ASSEMBLY FOR A POWERTRAIN OF A VEHICLE

(71) Applicant: Volvo Truck Corporation, Gothenburg (SE)

(72) Inventors: Jenny Lepa, Lindome (SE); Marcus Persson, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 27 days.

(21) Appl. No.: 17/778,813

(22) PCT Filed: Nov. 22, 2019

(86) PCT No.: PCT/EP2019/082206
§ 371 (c)(1),
(2) Date: May 20, 2022

(87) PCT Pub. No.: WO2021/098969
PCT Pub. Date: May 27, 2021

(65) Prior Publication Data
US 2022/0412446 A1    Dec. 29, 2022

(51) Int. Cl.
*F16H 57/02* (2012.01)
*B60K 1/02* (2006.01)
(Continued)

(52) U.S. Cl.
CPC .............. *F16H 57/02* (2013.01); *B60K 1/02* (2013.01); *B60K 23/00* (2013.01);
(Continued)

(58) Field of Classification Search
CPC .............. F16H 57/02; F16H 61/0006; F16H 2057/02026; F16H 2057/02034;
(Continued)

(56) References Cited

U.S. PATENT DOCUMENTS 10,305,349 B2    5/2019  Lukacsel
2016/0301283 A1*  10/2016  Lukacsel ............ H02K 5/10

FOREIGN PATENT DOCUMENTS

DE    20015782 U1    6/2001
EP     2228568 A1    9/2010
(Continued)

OTHER PUBLICATIONS

International Search Report and Written Opinion of the International Searching Authority, PCT/EP2019/082206, dated Mar. 18, 2020, 13 pages.

*Primary Examiner* — Victor L MacArthur
(74) *Attorney, Agent, or Firm* — Sage Patent Group (57) ABSTRACT

A transmission assembly for a powertrain of a vehicle, includes,
  a control device and a transmission housing for housing a transmission, the control device mountable to the transmission housing and including a transmission mounting surface adapted to face the transmission housing,
  the transmission housing including a control device mounting surface adapted to face the control device,
  one of the transmission mounting surface and the control device mounting surface including a groove including at least a first and a second step deeper than the first step, and
  the other of the transmission mounting surface and the control device mounting surface including an outwardly extending guiding member configured to be received in the groove, configured so that the outwardly extending guiding member can slide in the first step until it reaches the second step, whereafter the transmission mounting surface can be moved towards the control device mounting surface or vice versa.

17 Claims, 6 Drawing Sheets

(51) Int. Cl.
    *B60K 23/00*    (2006.01)
    *F16H 61/00*    (2006.01)

(52) U.S. Cl.
    CPC .................... *F16H 61/0006* (2013.01); *F16H 2057/02026* (2013.01); *F16H 2057/02034* (2013.01); *F16H 2057/02043* (2013.01)

(58) Field of Classification Search
    CPC ........... F16H 2057/02043; F16H 3/006; F16H 61/688; F16H 63/24; F16H 63/304; F16H 2057/0056; F16H 2063/3076; F16H 61/0003; B60K 1/02; B60K 23/00; Y02T 10/06
    See application file for complete search history.

(56)    References Cited

FOREIGN PATENT DOCUMENTS

EP    2881622 A1    6/2015
    WO    0151830 A1    7/2001

\* cited by examiner

TRANSMISSION ASSEMBLY FOR A POWERTRAIN OF A VEHICLE

CROSS REFERENCE TO RELATED APPLICATIONS

This application is a 35 U.S.C. §371 national stage application of PCT International Application No. PCT/EP2019/082206 filed on Nov. 22, 2019, the disclosure and content of which is incorporated by reference herein in its entirety.

TECHNICAL FIELD

The invention relates to a transmission assembly for a powertrain of a vehicle, a power train for a vehicle, a vehicle and/or to a method for mounting a control device to a transmission housing of a transmission assembly.

The invention can be applied in heavy-duty vehicles, such as trucks, buses and construction equipment. Although the invention will be described with respect to a heavy-duty truck, the invention is not restricted to this particular vehicle, but may also be used in other vehicles such as light-weight trucks, articulated haulers, excavators, wheel loaders, backhoe loaders, and also passenger cars.

BACKGROUND

Transmission assemblies for vehicles, also known as gearboxes, are configured for providing controlled application of power, by use of a number of drivingly connected gear wheels, from an input shaft to an output shaft. The transmission assembly hence comprises one or more gear wheels for providing speed and torque conversions from a rotating power source to e.g. one or more driven axles of a vehicle.

The rotating power source may be any kind of power source, such as an internal combustion engine and one or more electrical machines. The transmission assembly may hence be part of a powertrain for a vehicle which comprises the one or more power sources. It is for example known to provide a vehicle with at least two separate power sources, which may be electrical machines, where the power therefrom is provided via respective input shafts of the transmission assembly. Therefore such a transmission assembly may comprise at least two input shafts and at least one common output shaft.

With the development of using new power sources for vehicles, such as the above mentioned electrical machines, available space in the vehicle for accommodating the powertrain may be limited. For example, when using electric machines, other components, such as batteries, may also be provided nearby the transmission assembly and/or the powertrain, thereby reducing the available space in the vehicle.

Therefore, in view of the above, there is a need of developing more compact transmission assemblies and powertrains for vehicles.

SUMMARY

In view of the above, an object of the invention is to provide an improved transmission assembly for a powertrain of a vehicle, a powertrain for a vehicle, a vehicle, and/or an improved method for mounting a control device to a transmission housing of a transmission assembly, which at least in some aspect alleviates at least one of the drawbacks of the prior art, and/or to at least provide a useful alternative.

According to a first aspect of the invention, the object is achieved by a transmission assembly for a powertrain of a vehicle according to claim 1. According to a second aspect of the invention, the object is achieved by a powertrain for a vehicle according to claim 14. According to a third aspect of the invention, the object is achieved by a vehicle according to claim 16. According to a fourth aspect of the invention, the object is achieved by a method according to claim 17.

According to the first aspect thereof, the object is achieved by a transmission assembly for a powertrain of a vehicle which comprises a control device and a transmission housing for housing a transmission, wherein the control device is mountable to the transmission housing. The control device comprises a transmission mounting surface adapted to face the transmission housing when mounted thereto and the transmission housing comprises a corresponding control device mounting surface adapted to face the control device when the control device is mounted to the transmission housing. One of the transmission mounting surface and the control device mounting surface comprises at least one groove, which groove comprises at least a first and a second step, as seen in a direction being perpendicular to the one of the transmission mounting surface and the control device mounting surface, wherein the second step is deeper than the first step. The other one of the transmission mounting surface and the control device mounting surface comprises at least one outwardly extending guiding member, such as a pin, which is configured to be received in the groove, wherein the outwardly extending guiding member and the groove are configured so that the outwardly extending guiding member can slide in the first step until it reaches the second step, whereafter the transmission mounting surface can be moved towards the control device mounting surface or vice versa.

By the provision of the invention as disclosed herein, an improved transmission assembly can be achieved. More particularly, it has been realized that it may be difficult to mount the control device to the transmission housing in a safe and reliable manner without damaging parts of the transmission assembly. By the configuration of the transmission assembly as disclosed herein, where the outwardly extending guiding member can slide in the first step of the groove until it reaches the second step, it can be ensured that the control device mounting surface and the transmission mounting surface are not in contact when performing a blind assembly operation. In fact, when the outwardly extending guiding member slides in the first step of the groove, the control device will move with respect to the transmission housing, and this movement may be part of the blind assembly operation, which will be further elaborated in the below.

Optionally, the outwardly extending guiding member and the groove may be configured so that the outwardly extending guiding member can slide in the first step in a direction which is parallel to, or substantially parallel to, the control device mounting surface and/or the transmission mounting surface.

Optionally, the first step and the outwardly extending guiding member may be configured so that a gap is present between the transmission mounting surface and the control device mounting surface when the outwardly extending guiding member is in contact with the first step. Thereby, possible contact between the two mounting surfaces may be avoided or prohibited.

Optionally, the second step and the outwardly extending guiding member may be configured so that the transmission mounting surface and the control device mounting surface can firmly contact each other when the outwardly extending guiding member is provided at the second step in the groove. The term "firmly contact each other" as used herein means that the two mounting surfaces are contacting each other so that there is no, or minimal, clearance therebetween. Thus, put differently, the outwardly extending guiding member does not contact the second step in the groove, or a bottom surface of the second step in the groove, when the control device mounting surface and the transmission mounting surface are firmly contacting each other.

Optionally, the transmission assembly may further comprise a sealing means to seal an interface between the transmission mounting surface and the control device mounting surface when the control device is mounted to the transmission housing. The sealing means may for example be a seal gasket, which is separate and/or integrated with any one of the transmission housing and the control device, or the sealing means may be any other similar member for providing a static sealing function between the two mounting surfaces. By the provision of the invention as disclosed herein, such sealing means may be protected from being damaged during e.g. the aforementioned blind assembly operation.

Optionally, the one of the transmission mounting surface and the control device mounting surface may comprise at least two, three or more of the at least one groove, and the other one of the transmission mounting surface and the control device mounting surface may comprise at least two, three or more of the at least one outwardly extending guiding member. Providing a plurality of the grooves/outwardly extending guiding members may imply a more robust and reliable blind assembly operation, minimizing the risk of contact between the transmission mounting surface and the control device mounting surface during assembly. For example, if having three pairs of the grooves/outwardly extending guiding members provided on the two mounting surfaces, the risk of contact therebetween when the outwardly extending guiding members are sliding in the first steps of the respective grooves can be significantly reduced or eliminated.

Optionally, at least one of the control device mounting surface and the transmission mounting surface may comprise at least one auxiliary guiding member for guiding the control device in respect of the transmission housing during assembly so that the outwardly extending guiding member can be guided to the first step in the groove. Thereby further facilitated blind assembly operation may be provided, whereby the risk of the outwardly extending guiding member not "finding" the first step can be minimized or eliminated.

Optionally, the control device may comprise a set of actuators extending from a plane defined by the transmission mounting surface, wherein the control device is configured to actuate gear shifting members by moving the actuators in an actuation direction. Still optionally, the actuation direction may form an angle α with respect to a direction perpendicular to the plane defined by the transmission mounting surface, wherein $-45°<\alpha<45°$. Still optionally, the actuation direction may be perpendicular to, or essentially perpendicular to, the plane defined by the transmission mounting surface.

Optionally, the transmission assembly may further comprise a transmission comprising at least one input shaft configured to be drivingly connected to at least one propulsion unit of the powertrain, and at least one output shaft configured to be drivingly connected to at least one driving axle of the vehicle. The transmission assembly may further comprise a set of gears configured for transmission of torque from the at least one input shaft to the at least one output shaft, a set of gear shifting members for selectively engaging at least one gear of the set of gears, wherein each one of the actuators is arranged to actuate at least one of the gear shifting members when the control device is mounted to the transmission housing.

Optionally, the set of actuators and the gear shifting members may be connectable and configured so that a coupling direction for coupling the set of actuators to the gear shifting members is parallel to, or essentially parallel to, the control device mounting surface and/or the transmission mounting surface.

Optionally, the control device mounting surface may extend in a direction that is perpendicular to or essentially perpendicular to an axial direction of the input shaft.

According to the second aspect thereof, the object is achieved by a powertrain for a vehicle, comprising at least one propulsion unit and a transmission assembly according to any one of the embodiments of the first aspect of the invention.

Advantages and effects provided by the second aspect of the invention are largely analogous to the advantages and effects provided by the first aspect of the invention. It shall also be noted that all embodiments of the second aspect of the invention are applicable to and combinable with all embodiments of the first aspect of the invention and vice versa.

Optionally, the at least one propulsion unit may comprise at least one electric machine.

According to the third aspect thereof, the object is achieved by a vehicle comprising a transmission assembly according to any one of the embodiments of the first aspect of the invention and/or a powertrain according to any one of the embodiments of the second aspect of the invention.

Advantages and effects provided by the third aspect of the invention are largely analogous to the advantages and effects provided by the first and second aspects of the invention. It shall also be noted that all embodiments of the third aspect of the invention are applicable to and combinable with all embodiments of the first and second aspects of the invention and vice versa.

According to the fourth aspect thereof, the object is achieved by a method for mounting a control device to a transmission housing of a transmission assembly according to any one of the embodiments of the first aspect of the invention. The method comprises:
  moving the control device towards the transmission housing so that the outwardly extending guiding member moves into the first step in the groove,
  moving the control device so that the outwardly extending guiding member slides in the first step until it reaches the second step,
  moving the control device towards the transmission housing until the transmission mounting surface contacts the control device mounting surface.

Advantages and effects provided by the fourth aspect of the invention are largely analogous to the advantages and effects provided by the first aspect of the invention. It shall also be noted that all embodiments of the fourth aspect of the invention are applicable to and combinable with all embodiments of the first, second and third aspects of the invention and vice versa.

BRIEF DESCRIPTION OF THE DRAWINGS

With reference to the appended drawings, below follows a more detailed description of embodiments of the invention cited as examples.

In the drawings.

The drawings show diagrammatic exemplifying embodiments of the present invention and are thus not necessarily drawn to scale. It shall be understood that the embodiments shown and described are exemplifying and that the invention is not limited to these embodiments. It shall also be noted that some details in the drawings may be exaggerated in order to better describe and illustrate the invention. Like reference characters refer to like elements throughout the description, unless expressed otherwise.

DETAILED DESCRIPTION OF EXAMPLE EMBODIMENTS OF THE INVENTION

Figure 1:
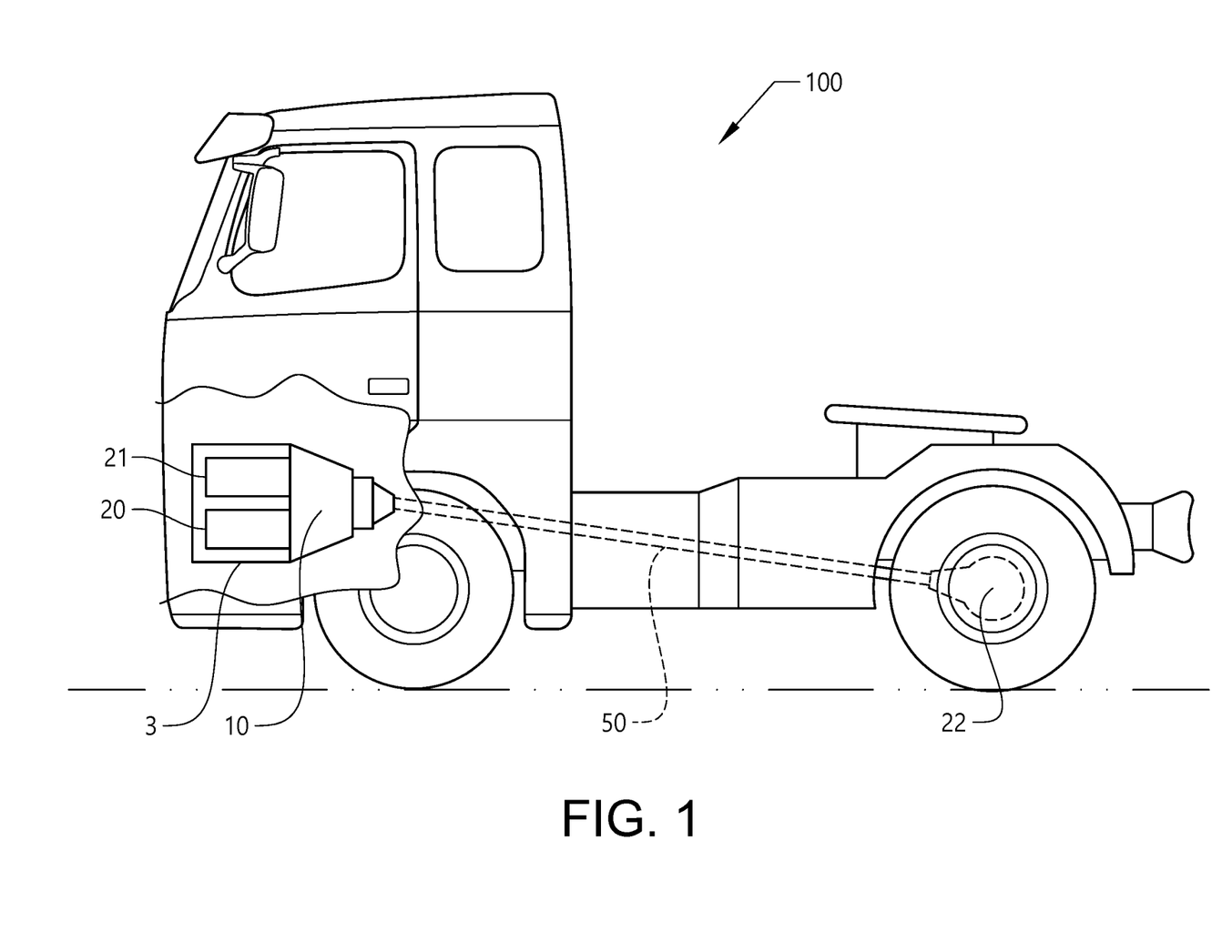
FIG. 1 shows a view of a vehicle according to an example embodiment of the third aspect of the present invention.

In FIG. 1 a vehicle 100 in the form of a heavy-duty truck is shown. The truck 100 comprises a transmission assembly 10 forming part of a powertrain 3 according to embodiments of the present invention. The transmission assembly 10 drivingly connects two electric machines 20, 21 with a propeller shaft 50, which in turn is drivingly connected to a driving axle 22, for example comprising a differential gear (not shown). It shall be noted that even though one driving axle 22 is shown, the propeller shaft 50 may be connected to more than one driving axle for driving ground engaging means, such as wheels. As also stated in the above, the present invention is not limited to trucks, but may also be used for other types of vehicles, such as buses, construction equipment vehicles etc.

Figure 2:
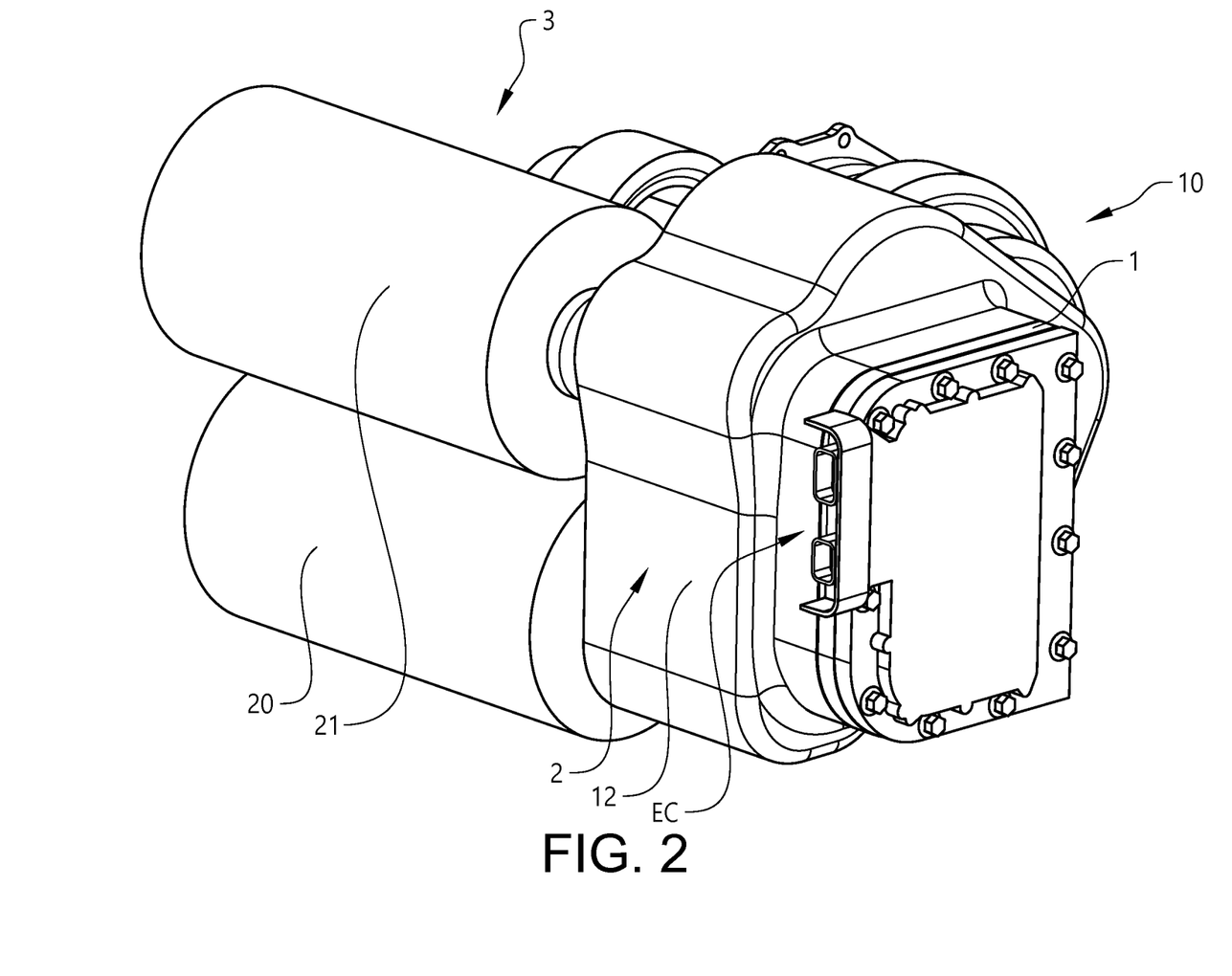
FIG. 2 shows a perspective view of a transmission assembly and a powertrain according to example embodiments of the present invention.

FIG. 2 shows a perspective view of a powertrain 3 and a transmission assembly 10 for a powertrain 3 of a vehicle 100 according to embodiments of the first and second aspects of the present invention. The transmission assembly 10 comprises a control device 1 and a transmission housing 12 for housing a transmission 2. In the shown embodiments, the transmission assembly 10 comprises the transmission 2, i.e. the transmission 2 is housed in the transmission housing 12. As further shown, the control device 1 is mountable to the transmission housing 12, and in the embodiment shown in FIG. 2 it is mounted to the transmission housing 12. The powertrain 3 comprises the transmission assembly 10 and two electric machines 20, 21.

Figure 3A:
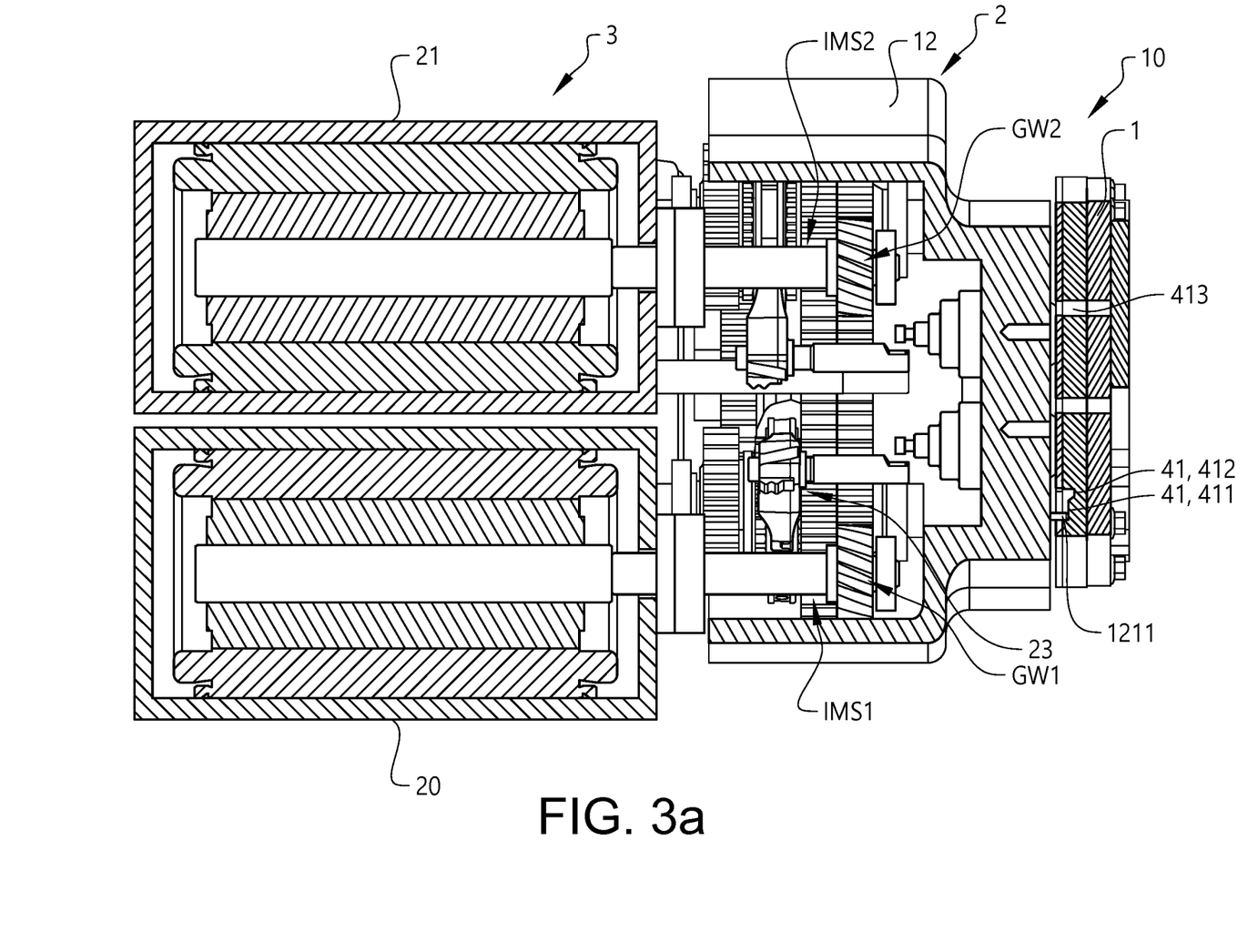
FIG. 3a-3d show sectional views of a powertrain and/or a transmission assembly according to example embodiments of the present invention.
Figure 3B:
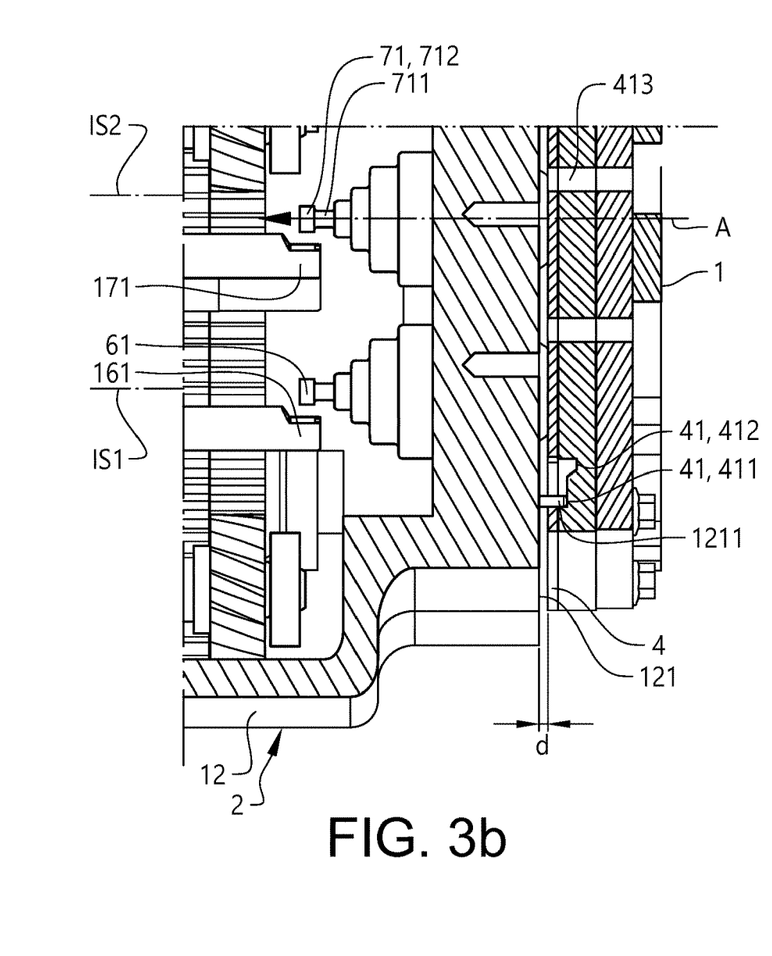
Figure 3C:
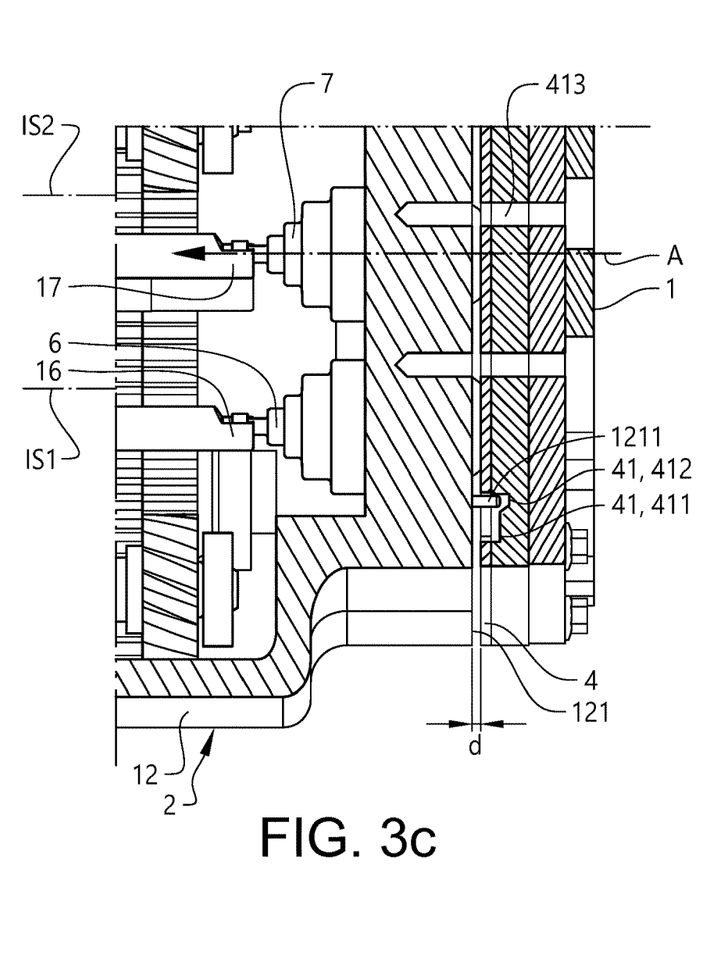
Figure 3D:
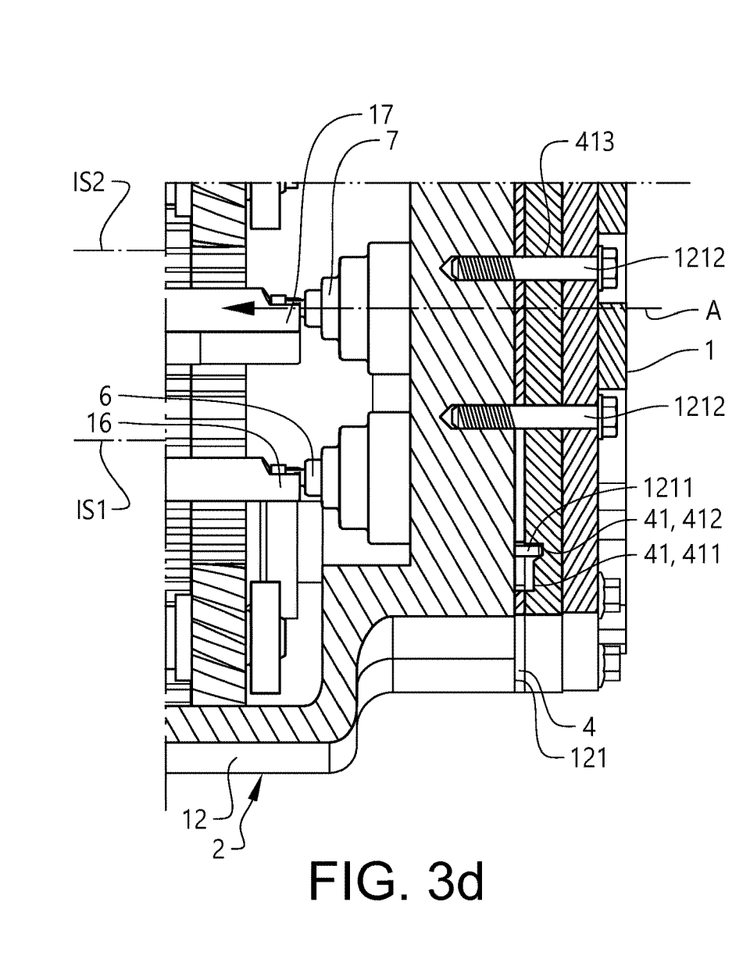
Figure 4A:
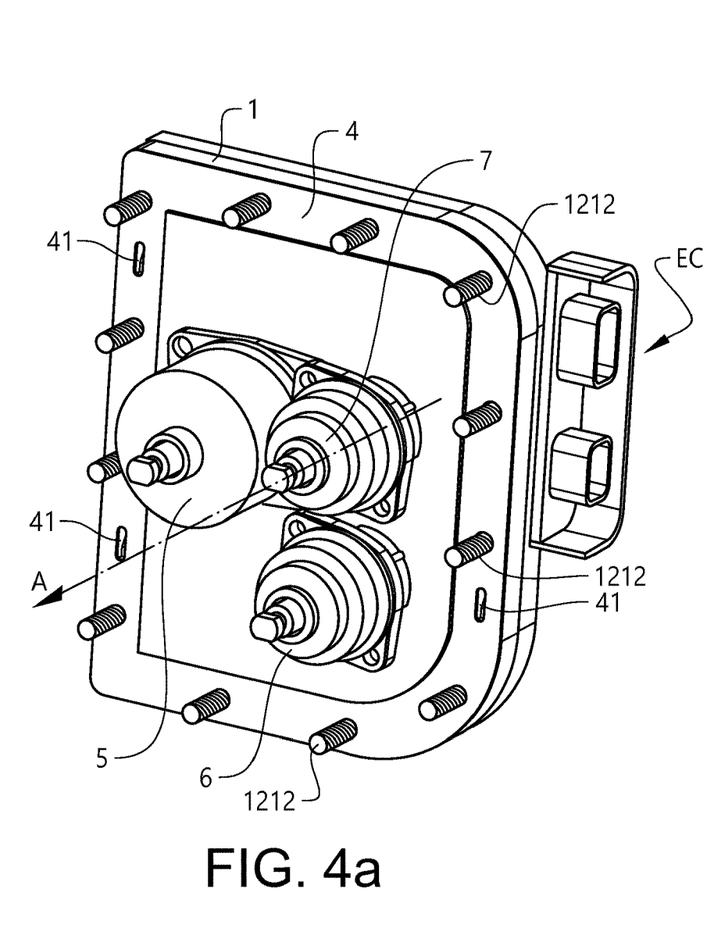
FIGS. 4a-4b show perspective views of a control device according to an example embodiment of the first aspect of the present invention.
Figure 4B:
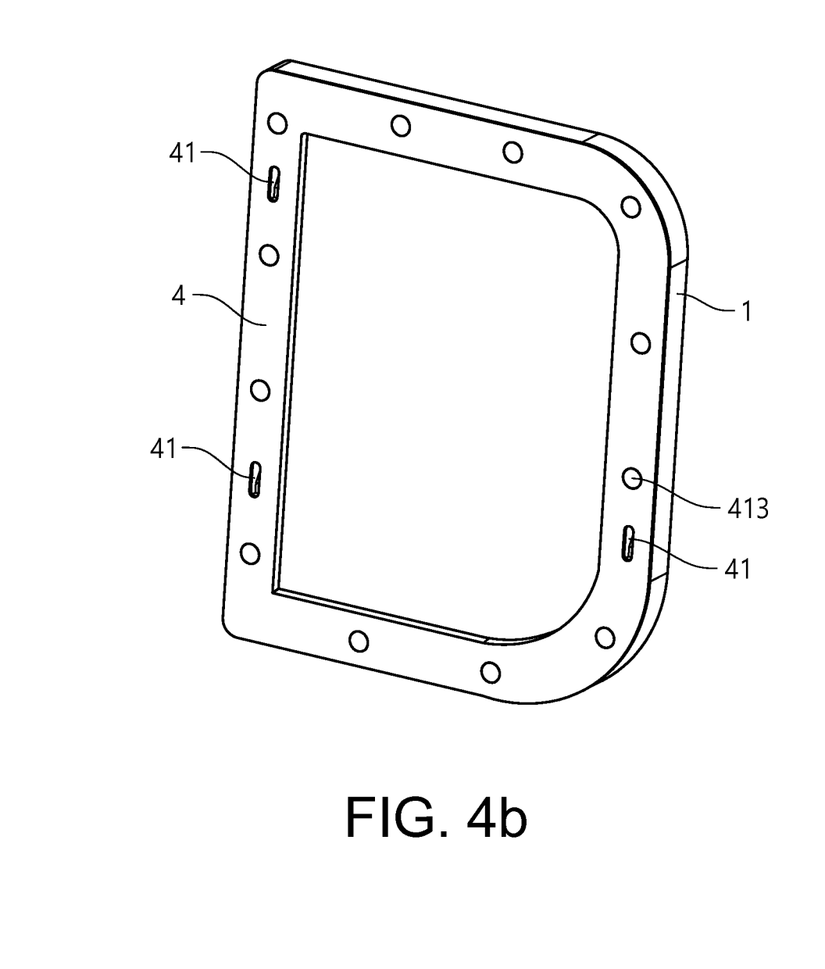

FIGS. 3a-3d show sectional views of the powertrain 3 and/or the transmission assembly 10 as shown in FIG. 2. Moreover, FIGS. 4a-4b show perspective views of a control device 1 according to the present invention, where in FIG. 4b certain details have been omitted to better illustrate the invention.

With respect to especially FIGS. 3a-3d and FIGS. 4a-4b, it is shown that the control device 1 comprises a transmission mounting surface 4 adapted to face the transmission housing 12 when mounted thereto, and that the transmission housing 12 comprises a corresponding control device mounting surface 121 adapted to face the control device 1 when the control device 1 is mounted to the transmission housing 12.

In the shown embodiments, the transmission mounting surface 4 comprises at least one groove 41, which groove comprises at least a first and a second step 411, 412, as seen in a direction being perpendicular to the transmission mounting surface 4. The second step 412 is deeper than the first step 411. Further, the control device mounting surface 121 comprises at least one outwardly extending guiding member 1211, which in the shown embodiments is in the form of a pin, and which is configured to be received in the groove 41. The outwardly extending guiding member 1211 and the groove 41 are configured so that the outwardly extending guiding member 1211 can slide in the first step 411 until it reaches the second step 412, whereafter the transmission mounting surface 4 can be moved towards the control device mounting surface 121 or vice versa. FIG. 3b shows when the outwardly extending guiding member 1211 is provided in the first step 411 of the groove 41 and FIG. 3c shows when the outwardly extending guiding member 1211 has reached the second step 412 so that the transmission mounting surface 4 can be moved towards the control device mounting surface 121, or vice versa. Further, FIG. 3d shows when the transmission mounting surface 4 has been moved towards the control device mounting surface 121 so that they firmly contact each other.

As further shown, the outwardly extending guiding member 1211 and the groove 41 may be configured so that the outwardly extending guiding member 1211 can slide in the first step in a direction which is parallel to, or substantially parallel to, the transmission mounting surface 4. This sliding direction may further be perpendicular to, or substantially perpendicular to, an actuation direction A of gear shifting members 16, 17, which will be further described in the below. This configuration results in that the transmission mounting surface 4 and the control device mounting surface 121 will not come into contact with each other when actuators 5, 6, 7 of the control device 1 are being connected to corresponding gear shifting members 16, 17 of the transmission 2. The gear shifting members 16, 17 are connected to clutch members (not shown) for selectively engaging at least one gear of a set of gears 23 of the transmission 2. The clutch members may be configured in any suitable form known to the skilled person, e.g. it may be any one of a slip/friction clutch and/or a no-slip clutch, such as a dog clutch.

In the shown embodiments, see e.g. FIG. 3b, the first step 411 and the outwardly extending guiding member 1211 are configured so that a gap d is present between the transmission mounting surface 4 and the control device mounting surface 121 when the outwardly extending guiding member 1211 is in contact with the first step 411. As further shown in e.g. FIG. 3d, the second step 412 and the outwardly extending guiding member 1211 may be configured so that the transmission mounting surface 4 and the control device mounting surface 121 can firmly contact each other when the outwardly extending guiding member 1211 is provided at the second step 412 in the groove. More specifically, the second step 412 of the groove 41 is preferably deeper than the length of the axial extension of the corresponding outwardly extending guiding member 1211.

By the provision of the present invention, a sealing means (not shown) for sealing between the transmission mounting surface 4 and the control device mounting surface 121 can be protected from being damaged when the control device 1 is being mounted to the transmission housing 12. Further, the present invention facilitates connection of the actuators 5, 6, 7 to the gear shifting members 16, 17 when there are restricted possibilities of visually monitoring the assembly operation. Thus, the control device 1 can be reliably and more easily connected to the transmission housing 12 without the risk of damaging the optional sealing means. Thereby, the present invention provides for an improved blind assembly operation, i.e. an operation where a user/operator is unable to visually follow the assembly operation of the control device 1 to the transmission housing 12.

The transmission mounting surface 4 may as shown in FIGS. 4a-4b comprise at least two, three or more of the at least one groove 41, and the control device mounting surface 121 may thereby also comprise at least two, three or more of the at least one outwardly extending guiding member 1211. Three grooves/outwardly extending guiding members may be preferred to avoid or eliminate the risk of contact between the two mounting surfaces 41, 121 when the outwardly extending guiding members 1211 are provided at the respective first steps 411 of the grooves 41. However, two, or possibly only one, pair(s) of grooves/outwardly extending guiding members may suffice. For example, three grooves 41 are shown in FIG. 4a.

As mentioned in the above, at least one of the control device mounting surface 121 and the transmission mounting surface 4 may comprise at least one auxiliary guiding member (not shown) for guiding the control device 1 in respect of the transmission housing 12 during assembly so that the outwardly extending guiding member 1211 can be guided to the first step 411 in the groove 41. Such auxiliary guiding member may for example be one or more additional pins.

The control device 1 and the transmission housing 12 may as shown further comprise a plurality of apertures 413 in which screws 1212 or the like can be provided for attaching the control device 1 to the transmission housing 12. The apertures 413, which here extends through the control device 1 and into the transmission housing 12, and the screws 1212 are preferably threaded.

In the shown embodiments, the control device 1 further comprises the set of actuators 5, 6, 7 which extends from a plane defined by the transmission mounting surface 4, wherein the control device 1 is configured to actuate the gear shifting members 16, 17 by moving the actuators 5, 6, 7 in the actuation direction A. As shown in e.g. FIG. 4a, the transmission mounting surface 4 encloses an area which the set of actuators 5, 6, 7 are arranged to extend from and/or through. Correspondingly, the control device mounting surface 121 also encloses an area which the set of actuators 5, 6, 7 are arranged to extend through when the control device 1 is mounted to the transmission housing 12.

Further, in the shown embodiments, the actuation direction A is perpendicular to, or essentially perpendicular to, the plane defined by the transmission mounting surface 4. It shall here be noted that the actuation direction A may vary as disclosed herein.

The transmission assembly 10 further comprises the transmission 2. The transmission 2 comprises at least one input shaft (not shown) configured to be drivingly connected to at least one propulsion unit 20, 21 of the powertrain 3, at least one output shaft (not shown) configured to be drivingly connected to the at least one driving axle 22 of the vehicle, a set of gears 23 configured for transmission of torque from the at least one input shaft to the at least one output shaft. The rotational axis of each input shaft is in the shown embodiments indicated by dash-dotted lines IS1, IS2. Further, in the shown embodiments, each electric machine 20, 21 is drivingly connected to one input shaft each, via respective intermediate shafts IMS1, IMS2. Each intermediate shaft IMS1, IMS2 is drivingly connected to the respective input shaft via respective meshing gear wheels GW1, GW2.

The transmission 2 further comprises the set of gear shifting members 16, 17 for selectively engaging at least one gear of the set of gears 23, wherein each one of the actuators 5, 6, 7 is arranged to actuate at least one of the gear shifting members 16, 17 when the control device 1 is mounted to the transmission housing 12. The set of actuators 5, 6, 7 and the gear shifting members 16, 17 are connectable and configured so that a coupling direction for coupling the set of actuators 5, 6, 7 to the gear shifting members 16, 17 is parallel to, or essentially parallel to, the control device mounting surface 121 and the transmission mounting surface 4. In the shown embodiments, the coupling direction is also perpendicular to, or essentially perpendicular to the actuation direction A. More specifically, according to an embodiment of the present invention, each actuator 5, 6, 7 may comprise a connection means 61, 71, which is adapted to be connected to and received in a corresponding receiving means 161, 171 of the gear shifting members 16, 17, whereby the connection means 61, 71 and the receiving means 161, 171 are configured to be coupled by insertion of the connection means 61, 71 into the receiving means 161, 171 in the above mentioned coupling direction. Alternatively, each actuator 5, 6, 7 may comprise a receiving means and each gear shifting member 16, 17 may comprise a connection means. Purely by way of example, the connection means 61, 71 may be formed as a pin having a waist section 711 with a reduced diameter and an outer head portion 712 provided outside the waist section having a larger diameter, as shown in e.g. FIGS. 3b-3d. The receiving means 161, 171 may be configured so that it can receive the head portion therein and so that when the head portion is received therein, an axial relative movement therebetween is prohibited, or at least very small. Thereby the actuators 5, 6, 7 may efficiently and reliably shift gears during use without for example any risk of unwanted or too much play.

Figure 5:
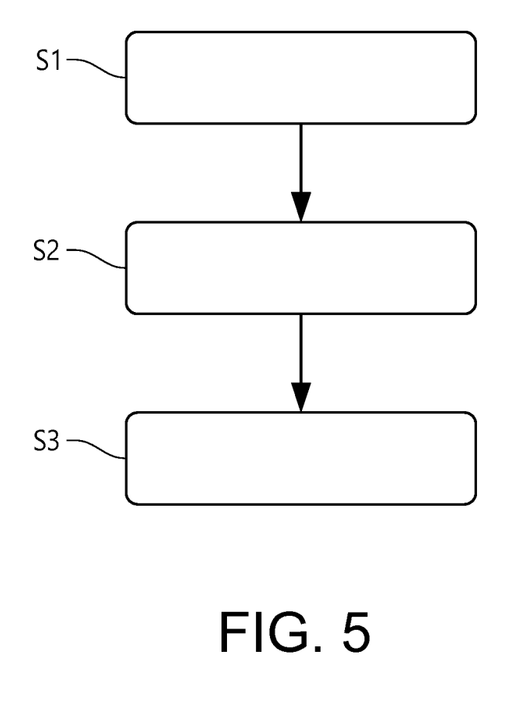
FIG. 5 shows a flowchart of a method according to an example embodiment of the fourth aspect of the present invention.

FIG. 5 shows a flowchart of a method for mounting a control device 1 to a transmission housing 12 of a transmission assembly 10 as e.g. shown in FIGS. 2-3d. The method comprises the following steps:
- S1: moving the control device 1 towards the transmission housing 12 so that the outwardly extending guiding member 1211 moves into the first step 411 in the groove 41,
- S2: moving the control device 1 so that the outwardly extending guiding member 1211 slides in the first step 411 until it reaches the second step 412, and
- S3: moving the control device 1 towards the transmission housing 12 until the transmission mounting surface 4 contacts the control device mounting surface 121.

It shall here also be noted that the movement of the control device 1 and the transmission housing 12 is relative. Hence, the above method may also be conducted in a similar manner by moving the transmission housing 12 with respect to the control device 1.

By the provision of the invention as disclosed herein, a blind assembly operation may be efficiently conducted without the risk of e.g. damaging sealing means which may be provided between the control device mounting surface 121 and the transmission mounting surface 4. Further, by the provision of the invention as disclosed herein, a compact transmission assembly 10 can be provided, allowing for other components, such as power sources (e.g. batteries) for the electric machines, to be packed nearby the transmission assembly 10.

The control device 1 may further preferably comprise an electronic control unit (not shown) for controlling the movement of the actuators 5, 6, 7. Thereby the transmission assembly 10 may be an automated manual transmission or an automatic mechanically engaged transmission (AMT) for a vehicle, such as a truck. The electronic control unit may be adapted to receive signals relating to initiation of a gear shifting operation, by moving the actuators 5, 6, 7. The signals may e.g. be received from another electronic control unit (ECU) of the vehicle, and/or the signals may be received when a user of the vehicle actuates a gear shifting control device, such as a gear shifting paddle or the like. The signals may for example be received via electrical connections EC, and/or the signals may be received by wireless transmission.

It is to be understood that the present invention is not limited to the embodiments described above and illustrated in the drawings; rather, the skilled person will recognize that many changes and modifications may be made within the scope of the appended claims.

The invention claimed is:

1. A transmission assembly for a powertrain of a vehicle, comprising,
   a control device and a transmission housing for housing a transmission, wherein the control device is mountable to the transmission housing,
   the control device comprising a transmission mounting surface adapted to face the transmission housing when mounted thereto,
   the transmission housing comprising a corresponding control device mounting surface adapted to face the control device when the control device is mounted to the transmission housing, wherein,
   one of the transmission mounting surface and the control device mounting surface comprises at least one groove, which groove comprises at least a first and a second step, as seen in a direction being perpendicular to the one of the transmission mounting surface and the control device mounting surface, wherein the second step is deeper than the first step, and
   the other one of the transmission mounting surface and the control device mounting surface comprises at least one outwardly extending guiding member, which is configured to be received in the groove, and wherein the outwardly extending guiding member and the groove are configured so that the outwardly extending guiding member can slide in the first step until it reaches the second step, whereafter the transmission mounting surface can be moved towards the control device mounting surface or whereafter the control device mounting surface can be moved towards the transmission mounting surface,
   wherein the control device comprises a set of actuators extending from a plane defined by the transmission mounting surface, wherein the control device is configured to actuate gear shifting members of the transmission assembly by moving the actuators in an actuation direction.

2. The transmission assembly according to claim 1, wherein the outwardly extending guiding member and the groove are configured so that the outwardly extending guiding member can slide in the first step in a direction which is parallel to, or substantially parallel to, the control device mounting surface and/or the transmission mounting surface.

3. The transmission assembly according to claim 1, wherein the first step and the outwardly extending guiding member are configured so that a gap is present between the transmission mounting surface and the control device mounting surface when the outwardly extending guiding member is in contact with the first step.

4. The transmission assembly according to claim 1, wherein the second step and the outwardly extending guiding member are configured so that the transmission mounting surface and the control device mounting surface can firmly contact each other when the outwardly extending guiding member is provided at the second step in the groove.

5. The transmission assembly according to claim 1, further comprising a sealing means to seal an interface between the transmission mounting surface and the control device mounting surface when the control device is mounted to the transmission housing.

6. The transmission assembly according to claim 1, wherein at least one of the control device mounting surface and the transmission mounting surface comprises at least one auxiliary guiding member for guiding the control device in respect of the transmission housing during mounting so that the outwardly extending guiding member can be guided to the first step in the groove.

7. The transmission assembly according to claim 1, wherein the actuation direction forms an angle α with respect to a direction perpendicular to the plane defined by the transmission mounting surface, wherein −45°<α<45°.

8. The transmission assembly according to claim 1, wherein the actuation direction is perpendicular to, or essentially perpendicular to, the plane defined by the transmission mounting surface.

9. The transmission assembly according to claim 1, further comprising,
   a transmission comprising at least one input shaft configured to be drivingly connected to at least one propulsion unit of the powertrain, at least one output shaft configured to be drivingly connected to at least one driving axle of the vehicle, a set of gears configured for transmission of torque from the at least one input shaft to the at least one output shaft,
   a set of gear shifting members for selectively engaging at least one gear of the set of gears,
   wherein each one of the actuators is arranged to actuate at least one of the gear shifting members when the control device is mounted to the transmission housing.

10. The transmission assembly according to claim 9, wherein the set of actuators and the gear shifting members are connectable and configured so that a coupling direction for coupling the set of actuators to the gear shifting members is parallel to, or essentially parallel to, the control device mounting surface and/or the transmission mounting surface.

11. The transmission assembly according to claim 9, wherein the control device mounting surface extends in a direction that is perpendicular to or essentially perpendicular to an axial direction of the input shaft.

12. A vehicle comprising a powertrain according to claim 11.

13. A powertrain for a vehicle, comprising at least one propulsion unit and a transmission assembly according to claim 9.

14. The powertrain according to claim 13, wherein the at least one propulsion unit comprises at least one electric machine.

15. A vehicle comprising a transmission assembly according to claim 9.

16. A method for mounting a control device of a transmission assembly to the transmission housing of a transmission assembly according to claim 1, the method comprising:
- moving the control device towards the transmission housing so that the outwardly extending guiding member moves into the first step in the groove,
- moving the control device so that the outwardly extending guiding member slides in the first step until it reaches the second step,
- moving the control device towards the transmission housing until the transmission mounting surface contacts the control device mounting surface.

17. The transmission assembly according to claim 1, wherein the outwardly extending guiding member comprises a pin.

* * * * *